United States Patent
Kihas

(10) Patent No.: US 9,760,073 B2
(45) Date of Patent: Sep. 12, 2017

(54) TECHNIQUE AND TOOL FOR EFFICIENT TESTING OF CONTROLLERS IN DEVELOPMENT

(75) Inventor: Dejan Kihas, Burnaby (CA)

(73) Assignee: Honeywell International Inc., Morris Plains, NJ (US)

( * ) Notice: Subject to any disclaimer, the term of this patent is extended or adjusted under 35 U.S.C. 154(b) by 711 days.

(21) Appl. No.: 12/785,281

(22) Filed: May 21, 2010

(65) Prior Publication Data

US 2011/0288846 A1 Nov. 24, 2011

(51) Int. Cl.
| | |
|---|---|
| G06G 7/62 | (2006.01) |
| G05B 17/02 | (2006.01) |
| G05B 13/02 | (2006.01) |
| G05B 19/418 | (2006.01) |
| G05B 13/04 | (2006.01) |

(52) U.S. Cl.
CPC ............ *G05B 17/02* (2013.01); *G05B 13/024* (2013.01); *G05B 13/042* (2013.01); *G05B 13/048* (2013.01); *G05B 19/41875* (2013.01); *G05B 19/41885* (2013.01); *G05B 2219/23451* (2013.01)

(58) Field of Classification Search
USPC ......................................................... 702/119
See application file for complete search history.

(56) References Cited

U.S. PATENT DOCUMENTS

| | | | |
|---|---|---|---|
| 4,663,703 A * | 5/1987 | Axelby et al. .................. | 700/29 |
| 5,394,322 A * | 2/1995 | Hansen .......................... | 700/37 |
| 5,682,309 A * | 10/1997 | Bartusiak et al. .............. | 700/29 |
| 5,912,901 A | 6/1999 | Adams et al. ................. | 714/733 |
| 6,459,939 B1 * | 10/2002 | Hugo ............................... | 700/44 |
| 6,560,503 B1 * | 5/2003 | Toprac et al. .................. | 700/108 |
| 6,564,117 B1 | 5/2003 | Chen et al. .................... | 700/129 |
| 6,578,189 B2 | 6/2003 | Le et al. ........................ | 714/736 |
| 6,597,958 B1 * | 7/2003 | Starr ............................... | 700/29 |
| 6,738,938 B2 | 5/2004 | Nadeau-Dostie et al. .... | 714/719 |
| 6,790,034 B1 * | 9/2004 | Kearns et al. .................. | 432/37 |
| 6,795,790 B1 * | 9/2004 | Lang et al. .................... | 702/123 |
| 6,993,403 B1 * | 1/2006 | Dadebo et al. ................ | 700/108 |
| 7,415,389 B2 * | 8/2008 | Stewart et al. ................ | 702/185 |
| 7,647,539 B2 | 1/2010 | Bussa et al. ................... | 714/738 |
| 7,650,195 B2 * | 1/2010 | Fan et al. ......................... | 700/31 |

(Continued)

OTHER PUBLICATIONS

Silvio Rendon, Jul. 2003, Fixed and Random Effects in Classical and Bayesian Regression, p. 5, Point 3.*

*Primary Examiner* — Paul D Lee
(74) *Attorney, Agent, or Firm* — Seager, Tufte & Wickhem, LLP

(57) ABSTRACT

An improved tool and technique for performance quality testing of a synthesized controller or a controller-in-development is disclosed. A controller's performance in a test run within a simulation testing environment is quantitatively compared to an optimal performance parameter as defined in a controller performance model. Deviation between these compared results is recorded as an indicator of poor controller performance. Only deviating test results are recorded for review to guide further fine tuning or modifications of controller settings, and to save mass storage space. The controller performance test runs autonomously and may be automatically restarted should any failure within the simulation environment occur.

21 Claims, 11 Drawing Sheets

(56) References Cited

U.S. PATENT DOCUMENTS

| | | | |
|---|---|---|---|
| 7,787,978 B2* | 8/2010 | Dash et al. | 700/108 |
| 7,926,012 B1* | 4/2011 | Parimi et al. | 716/106 |
| 8,214,159 B2* | 7/2012 | Zhang et al. | 702/31 |
| 8,244,384 B2* | 8/2012 | Pachner et al. | 700/30 |
| 8,538,899 B1* | 9/2013 | Orqueda et al. | 706/13 |
| 2002/0080737 A1* | 6/2002 | Koo et al. | 370/329 |
| 2002/0123864 A1* | 9/2002 | Eryurek et al. | 702/188 |
| 2002/0149332 A1* | 10/2002 | Inagaki et al. | 318/432 |
| 2003/0028268 A1* | 2/2003 | Eryurek et al. | 700/73 |
| 2003/0139825 A1* | 7/2003 | Lund | 700/29 |
| 2005/0197805 A1* | 9/2005 | Eryurek et al. | 702/188 |
| 2005/0268708 A1* | 12/2005 | Satou | B60T 8/172 73/146 |
| 2007/0044078 A1* | 2/2007 | Cifra | 717/135 |
| 2007/0118238 A1* | 5/2007 | Lefebvre et al. | 700/47 |
| 2007/0135937 A1* | 6/2007 | Vu | 700/29 |
| 2007/0156363 A1* | 7/2007 | Stewart et al. | 702/113 |
| 2007/0225835 A1* | 9/2007 | Zhu | G05B 13/042 700/44 |
| 2008/0077382 A1* | 3/2008 | Strehl | G06F 17/5022 703/20 |
| 2008/0208374 A1* | 8/2008 | Grgic et al. | 700/83 |
| 2008/0243289 A1* | 10/2008 | Yelchuru et al. | 700/109 |
| 2009/0089031 A1* | 4/2009 | Sturrock et al. | 703/7 |
| 2009/0198350 A1* | 8/2009 | Thiele | 700/30 |
| 2009/0292511 A1* | 11/2009 | Vrancic et al. | 703/2 |
| 2010/0049486 A1* | 2/2010 | Xu et al. | 703/6 |
| 2010/0145630 A1* | 6/2010 | Ball et al. | 702/31 |
| 2010/0204808 A1* | 8/2010 | Thiele | 700/30 |

* cited by examiner

FIG. 10

| | | tracking signal | | | constrained signal | | | oscillations | | actuators | | | Overshoots | Actuator Activity | |
|---|---|---|---|---|---|---|---|---|---|---|---|---|---|---|---|
| | | | | | C1 | | C2 | | | | A1 | A2 | | | A1 | A2 |
| indx | ss error | T1 | max | avg | err@min | err@max | err@min | err@max | Index | Rreg | a@limit | a@limit | NF | | | |
| 1 | 194.3870858 | 12882.87635 | 990.4138662 | 0 | 0 | 172.181276 | 0 | 0 | 1 | 93.8 | 36.8 | 100 | | 0 | 1 |
| 2 | 7.708903041 | 1187.19626 | 83.40694557 | 0 | 0 | 0 | 0 | 0 | 1 | 15.6 | 27 | 10.6 | 1 | 0 | 0 |
| 3 | 133.9232674 | 1392.361393 | 140.2494524 | 0 | 4.630143798 | 0 | 0 | 0 | 1 | 100 | 0.6 | 100 | 0 | 0 | 0 |
| 4 | 4.33035698 | 594.7656233 | 8.282447241 | 0 | 0 | 0 | 0 | 0 | 1 | 0 | 0 | 0 | 1 | 0 | 0 |
| 5 | 17.14942062 | 1071.379246 | 68.48299218 | 0 | 0 | 0 | 0 | 0 | 1 | 2.2 | 15.6 | 0 | 0 | 0 | 0 |
| 6 | 18.50421746 | 655.9705561 | 77.77837371 | 0 | 0 | 0 | 0 | 0 | 1 | 9.4 | 3 | 7.4 | 1 | 0 | 1 |
| 7 | 14.19463831 | 775.2992169 | 84.11337319 | 0 | 0 | 0 | 0 | 0 | 1 | 5.8 | 19.8 | 9.6 | 1 | 0 | 0 |
| 8 | 11.70284017 | 485.930022 | 15.36443561 | 0 | 0 | 0 | 0 | 0 | 1 | 0.4 | 0 | 0 | 0 | 0 | 0 |
| 9 | 12.05419473 | 1299.006238 | 127.8511835 | 0 | 0 | 0 | 0 | 0 | 1 | 7.2 | 12.8 | 11.8 | 1 | 0 | 1 |
| 10 | 10.84657366 | 1168.743353 | 52.3964299 | 0 | 0 | 0 | 0 | 0 | 1 | 4.6 | 18.8 | 0 | 0 | 0 | 0 |
| 11 | 8.965499008 | 110.7564186 | 10.49437496 | 0 | 0 | 0 | 0 | 0 | 1 | 0 | 0.6 | 0 | 0 | 0 | 0 |
| 12 | 7.393605018 | 208.8914033 | 9.466601285 | 0 | 0 | 0 | 0 | 0 | 1 | 0 | 0 | 0 | 0 | 0 | 0 |
| 13 | 6.662918822 | 923.8130657 | 64.39070751 | 0 | 0 | 0 | 0 | 0 | 1 | 3.4 | 9 | 13.4 | 0 | 0 | 1 |
| 14 | 5.487752764 | 1006.581849 | 12.37638487 | 0 | 0 | 0 | 0 | 0 | 1 | 1.2 | 1.2 | 0 | 1 | 0 | 0 |
| 15 | 6.862534446 | 608.107755 | 22.01351307 | 0 | 0 | 0 | 0 | 0 | 1 | 0.4 | 0.2 | 0 | 1 | 0 | 0 |
| 16 | 5.487752764 | 393.1915831 | 8.290628738 | 0 | 0 | 0 | 0 | 0 | 1 | 0 | 0 | 0 | 0 | 0 | 0 |
| 17 | 13.52447781 | 568.7425016 | 54.71710361 | 0 | 0 | 0 | 0 | 0 | 1 | 2.4 | 4.2 | 0 | 1 | 0 | 0 |
| 18 | 11.16947757 | 20.46323858 | 12.22093497 | 0 | 0 | 0 | 0 | 0 | 1 | 0 | 0 | 0 | 1 | 0 | 1 |
| 19 | 15.86719525 | 631.1080594 | 66.15659144 | 0 | 0 | 0 | 0 | 0 | 1 | 10.2 | 2.6 | 9 | 1 | 0 | 1 |
| 20 | 13.09066616 | 815.733136 | 19.03241376 | 0 | 0 | 0 | 0 | 0 | 1 | 1 | 3.4 | 0 | 1 | 0 | 1 |
| 21 | 10.79841418 | 112.9742726 | 12.49617191 | 0 | 0 | 0 | 0 | 0 | 1 | 0 | 0 | 0 | 1 | 0 | 0 |
| 22 | 8.256714159 | 1022.415495 | 79.31871482 | 0 | 0 | 0 | 0 | 0 | 1 | 11.8 | 3.6 | 7.4 | 1 | 1 | 0 |
| 23 | 6.782291064 | 808.1915145 | 12.51295783 | 0 | 0 | 0 | 0 | 0 | 1 | 0 | 1.6 | 0 | 0 | 0 | 0 |
| 24 | 237.5883779 | 1685.733136 | 608.4275102 | 0 | 0.526825487 | 0 | 341.0312383 | 0 | 0 | 95.2 | 38 | 100 | 1 | 0 | 0 |
| 25 | 4.643419913 | 957.0602057 | 10.51045688 | 0 | 0 | 0 | 0 | 0 | 1 | 0 | 3.8 | 0 | 0 | 0 | 0 |
| 26 | 196.9317012 | 1423.779977 | 564.089954 | 94.65294403 | 2.84570856 | 253.8746188 | 0 | 0 | 1 | 92 | 36.8 | 100 | 1 | 1 | 0 |
| 27 | 3.158584154 | 898.7899603 | 9.318451531 | 0 | 0 | 0 | 0 | 0 | 1 | 0.6 | 5.4 | 0 | 0 | 0 | 0 |
| 28 | 7.615708167 | 1009.188173 | 111.730959 | 0 | 0 | 0 | 0 | 0 | 1 | 5.8 | 25.6 | 0.2 | 1 | 0 | 0 |
| 29 | 6.287862232 | 907.5728533 | 12.87345688 | 0 | 0 | 0 | 0 | 0 | 1 | 0.2 | 1 | 0 | 1 | 0 | 0 |
| 30 | 11.77092719 | 913.4927053 | 91.78734189 | 0 | 0 | 0 | 0 | 0 | 1 | 4.4 | 4.4 | 0 | 0 | 0 | 0 |

TECHNIQUE AND TOOL FOR EFFICIENT TESTING OF CONTROLLERS IN DEVELOPMENT

TECHNICAL FIELD

Embodiments are generally related to controller performance systems and methods. Embodiments are additionally related to techniques for efficiently testing the developmental and performance quality of controllers.

BACKGROUND OF THE INVENTION

Controller performance testing is a very intensive undertaking. If testing is approached unsystematically and inefficiently, inaccurate results will preclude proper calibration and modification of a controller. It normally takes a user a vast amount of time to set testing parameters, perform a test, and sift through all controller performance test results. Many times these results are not broken down into successful and unsuccessful tests. A user has the tedious task of deciding which test results are unsuccessful to help guide the user in modifying the controller for further accurate testing of the modified controller's quality performance.

To ensure this accuracy, many software-in-the-loop (SIL) simulation and testing solutions exist for early testing of the functionality and reliability of a controller algorithm. Most SIL simulations, however, require constant attention from a user, both before testing a controller's quality and after testing a controller's quality. The user performs the tedious task of generating a large number of test cases and test runs, and re-starting the simulation environment following either memory or simulation platform failure. When data is generated during controller testing, a user must visualize and manipulate a vast quantity of data produced, both to review and process all generated controller test data to locate deficiencies in controller behavior. Once reviewed and processed, the user must determine how to re-set the controller's test run to further investigate possibilities for correcting located deficiencies, with this tedious review process repeating for every controller quality test. Further, all generated test data must be stored for a user to review, thus requiring large volume memory storage. Current SIL solutions for testing a controller's performance are labor intensive for developing a controller's design and for controller synthesis testing, performance evaluation, and tuning evaluations.

Testing of the controller takes a tremendous amount of time invested in simulations, data collection, manipulation and data analysis. Therefore, a need exists for an improved tool and technique for early testing of a synthesized controller or a controller-in-development, in a less labor intensive and time consuming fashion, as will be discussed in greater detail herein.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide an efficient test of controller's performance quality.

It is another aspect of the disclosed embodiments to quantify a controller's performance quality by comparing controller performance test results against a controller performance model.

It is another aspect of the disclosed embodiments to provide for an improved review of controller quality test results for efficiently selecting a deviating controller's performance test.

The aforementioned aspects and other objectives and advantages can now be achieved as described herein. An efficient controller quality testing method and system is disclosed herein. Such an approach can be implemented as a software module as a part of a control system simulation, wherein the control system can be based upon, but not limited to, model predictive control technology.

The disclosed controller testing tool and technique allows early testing of synthesized controller or a controller design in a less labor intensive and time consuming fashion. The testing tool can run without supervision and can restore itself if operation problems occur within a simulation environment. The tool stores and reports only test runs of controllers with deviating results. Test runs with deviating results help guide further modification of a controller for continued controller testing and performance improvements. The simulation environment may restart itself should the testing stop for any reason.

BRIEF DESCRIPTION OF THE DRAWINGS

The accompanying figures, in which like reference numerals refer to identical or functionally-similar elements throughout the separate views and which are incorporated in and form a part of the specification, further illustrate the invention and, together with the detailed description of the invention, serve to explain the principles of the disclosed embodiments.

FIG. 10 illustrates a graphical representation of a problems log containing values of a controller's key performance indicators, in accordance with the disclosed embodiments;

DETAILED DESCRIPTION

The particular values and configurations discussed in these non-limiting examples can be varied and are cited merely to illustrate varying embodiments and are not intended to limit the scope thereof.

Figure 1:
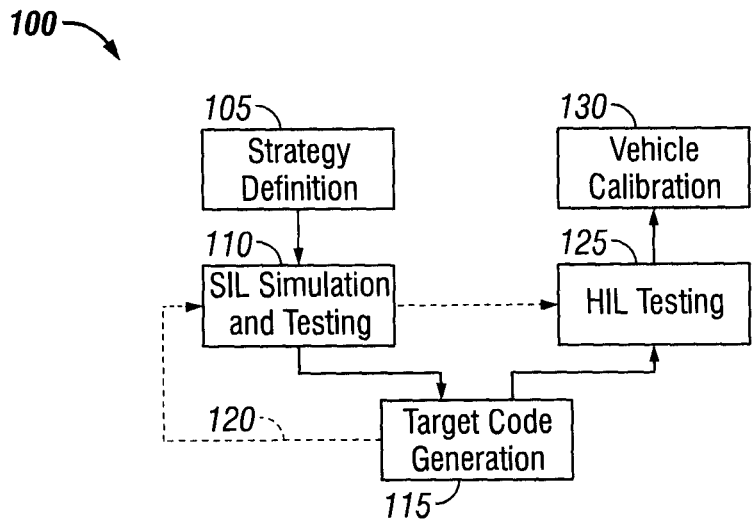
FIG. 1 illustrates a schematic block diagram of controller development and testing in a controller's development cycle, in accordance with the disclosed embodiments.

FIG. 1 illustrates a block diagram of controller development in the context of controller's development cycle and system 100, in accordance with the disclosed embodiments. As indicated in FIG. 1, system 100 is composed of five basic modules, including a strategy definition module 105, an SIL Simulation and Testing module 110, a Vehicle Calibration module 130, an HIL Testing module 125, and a Target Code Generation module 115. Controller software testing generally occurs in the development and tuning phase of a V-model of the controller's development cycle, specifically in the left arm of V-model development cycle of system 100. The V-model describes the lifecycle process model used in software development, detailing the problem to be solved, the method for solving the problem, and testing and simulation of that method for solving the problem.

Software-in-the-loop (SIL) simulation and testing of the controller, which can be implemented by module 110, follows strategy definition and functional block development via module 105. SIL simulation and testing via module 110 involves simulating target behavior for a controller performance model on a host system, such as MATLAB. Following SIL simulation testing via module 110, hardware-in-the-loop (HIL) testing via module 125 can be utilized directly if a controller template is being utilized and target code generation is not required. If a controller template is not available, it is necessary to perform target control generation via module 115 before starting HIL testing via module 125.

If no controller template is being used, then a target code can be generated via module 115 before starting HIL testing via module 125. A generated target code via module 115 can be further verified with further simulation and testing via module 110, wherein the code is manually developed and implemented. HIL testing via module 125 verifies the executable instructions for an embedded system or control unit by using a testing platform. Once HIL testing is completed, vehicle calibration activities via module 130 take place.

Figure 2:
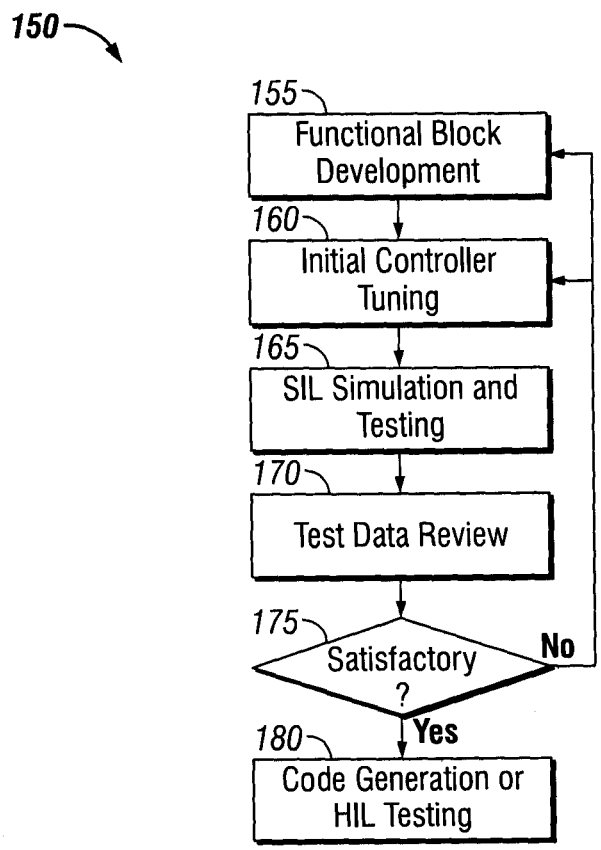
FIG. 2 illustrates a detailed flow chart of controller development and testing in a controller's development cycle, in accordance with the disclosed embodiments.

FIG. 2 illustrates a detailed flow chart of controller development and testing in a controller's development cycle, in accordance with the disclosed embodiments. Functional block development defines the control problem and sets the controller's performance requirements, as illustrated at block 155. Following functional block development 155, initial controller tuning defines the tuning settings of a controller for which the controller is going to be tested, as illustrated in block 160. SIL simulation and testing, as illustrated in block 165, is then used to investigate the behavior of the controller against the performance requirements specified in functional block development, as illustrated in block 155. SIL simulation and testing 165 generates test data for review, as illustrated in block 170. The validity of the controller design and tuning settings is investigated by reviewing any irregular, recorded data sets, as illustrated in block 175. The decision to modify any controller parameters or elements specified in the functional block development is based on any irregular data sets, to be described further below, produced from the controller testing. Should the controller testing quantification results prove satisfactory, either code for the controller may be generated or HIL testing may proceed, as illustrated in block 180.

Figure 3:
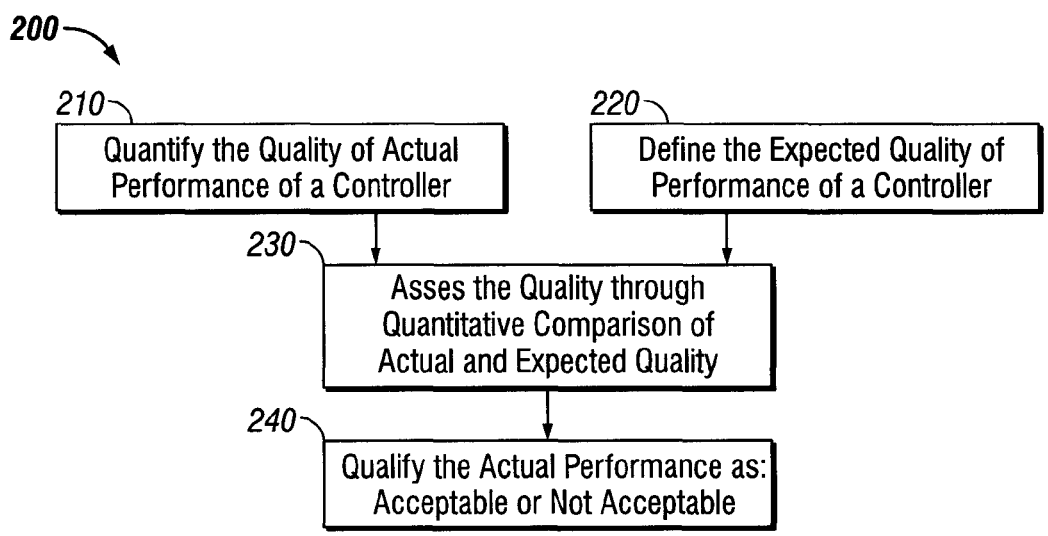
FIG. 3 illustrates a high level flow chart of controller performance quantification, in accordance with the disclosed embodiments.

FIG. 3 illustrates a high level flow chart of quantitative analysis of a controller's qualitative performance 200, in accordance with the disclosed embodiments. The controller testing evaluates the quality of an existing controller or a controller-in-development, where a controller is selected for testing and the performance requirements for the controller are established. Model-based testing is a type of testing applied to compare the controller's behavior with the controller's performance model, also known as a "rules based model". The controller performance model describes the desired behavior of the controller in the simulation environment, where the controller performance model is utilized for controller quality quantification. The controller performance model can be defined as a set of rules and a set of key performance indicators describing and identifying the desired controller performance and behavior. Key performance indicators are computed to quantify the quality of actual performance of a controller, as illustrated in block 210. The rules-based controller performance model is defined as a set of rules for the expected quality of performance of the controller in the simulation test, as illustrated in block 220. A controller can be tested in the simulation testing environment and its behavior quantitatively compared to the rules-based controller performance model using key performance indicators, as illustrated in block 230. Quantitative comparison of key performance indicators following expected performance allows the tested controller to be deemed either as acceptable or unacceptable for further use, as illustrated in block 240.

For example, Rule 1 within a controller performance model may define a desired result as follows: it is expected that tracking signal is not different from reference signal more than for a specific steady state error ($\epsilon$). When the actual result is a tracked signal with a steady-state value with a steady state error $>\epsilon$, then Rule 1 is broken because the steady state error is greater than set steady state error parameter. Rule 2 may define that the desired result is an output signal that in its steady state, does not exceed minimum and maximum constraints for more than offset parameter ($\delta$). When the actual result is a constrained signal with a steady state value outside of the set constraints with an offset $>\delta$, then Rule 2 is broken. If a controller is deemed unacceptable, the same test could be repeated to account for any previous testing errors for the controller with the same settings. Further, the same controller test could be repeated with the modified tuning parameters and constraints to achieve the desired controller performance specifications.

Figure 4:
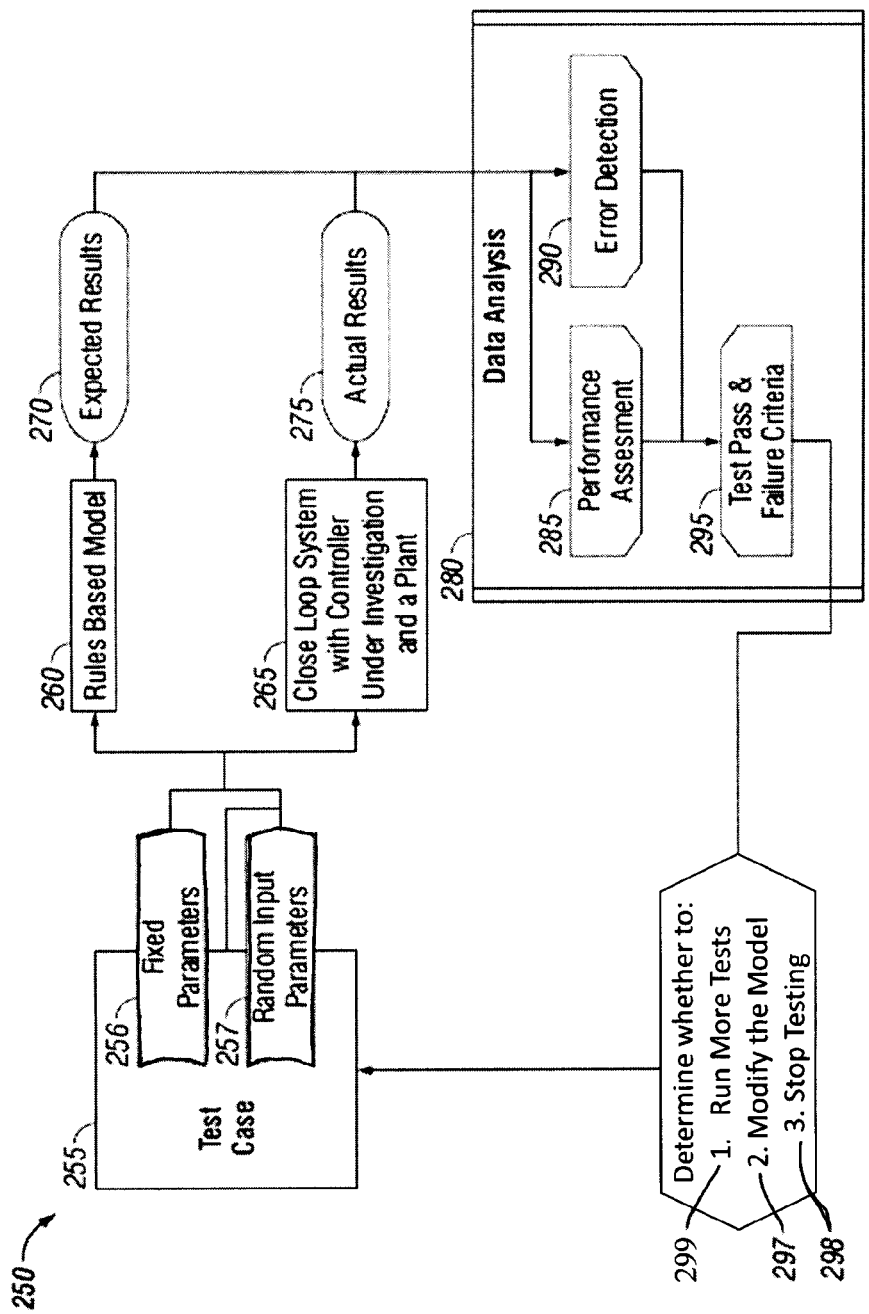
FIG. 4 illustrates a detailed flow chart of operation illustrating controller testing and quantification, in accordance with the disclosed embodiments.

FIG. 4 illustrates a detailed flow chart of a method for controller testing and quantification 250, in accordance with the disclosed embodiments. The testing procedure begins with defining a test case, as illustrated in block 255. The test case 255 is defined by fixed parameters 256 and random input parameters 257 in which to perform test runs with the controller. All fixed parameters 256 defining a test case 255 remain constant throughout a series of test runs. The number of fixed parameters 256 entered determines the number of possible test cases. Any number of fixed parameters 256 may be defined in a test case 255. Fixed parameters 256 may include: inputs and outputs of the plant, control strategy to be applied, controller topologies, internal control models, controller tuning parameters, soft constraints parameters, or dead band parameters.

While test case 255 input parameters remain constant throughout a test run, test runs are further defined by random input parameters 257 that specify properties of random input variations between test runs. The test run random input parameters 257 specify the ranges for random input signals. Random input signals are generated using an algorithm for random number generation. Parameters specifying random input signals (random input parameters), including seed numbers for random number generators may be recorded to repeat test runs. Possible test run random input signals 257 may include: set points, exogenous disturbances as disturbance variable input, exogenous disturbance without feed forward, exogenous output constraints, or exogenous input constraints.

The rules-based controller performance model is established to quantitatively analyze the controller's performance quality, as illustrated in block 260. The controller is then tested in numerous test runs using SIL (software in the loop) computer-implemented simulation test methods in a simulation test system with the controller under investigation in a plant, as illustrated in block 265. The actual results 275 of the controller's test runs are compared to the expected results from the controller performance model 270 during data analysis, as illustrated in block 280.

Quantitative analysis of the test results occurs in two modules: the performance assessment module 285 and the error detection module 290. The performance assessment module 285 analyzes the degree of deviation from the expected results as established in the controller performance model 260. The error detection module 290 analyzes whether the actual results are consistent with the expected results, with any deviation recorded as a failed actual test result as compared to the expected results from the controller performance model 260. The values analyzed in both the performance assessment module 285 and the error detection module 290 are viewed in conjunction as indicators of a controller's performance quality. If any error is detected 290 between the actual results 275 of a test run and the expected results as defined by key performance indicators and true/false statements in the controller performance model 270, then those test run results fall outside the test pass and failure criteria 295 of the expected results from the controller performance model 270 are recorded for review. For example, suppose an actual controller status index signal does not change when any output signal violates a constraint as it is specified in the expected result for a controller status signal-related Rules. If the actual result for a tested controller is a constant controller status index signal throughout a test run, then an error is detected within that test run and it may indicate an error in the controller code or the controller algorithm. The recorded results influence the user's decision on parameter modifications of either the controller or the controller performance model for the following test runs. Results that fall within the expected parameters are not recorded for review to reduce the amount of necessary mass storage space and time required to review the test results.

Following review of deviating test runs, the controller's parameters and constraints may be modified. Additional tests 299 on the controller could be performed to check for controller error using the same test case 255 with the same fixed parameters 256. A new set of test runs may be conducted following modification of fixed parameters within a test case. If the controller's results conform to the controller performance model, the controller performance model may be modified with more stringent tests to further help fine tuning of the controller. The user may also decide to stop testing 298 a controller if the controller fails a specific test runs. The controller may be redesigned depending on the quantity of deviating results and the severity of the detected errors. The user may decide to stop testing 298 if the user is satisfied with the results of all controller test runs and a sufficient number of test runs are completed successfully.

Figure 5:
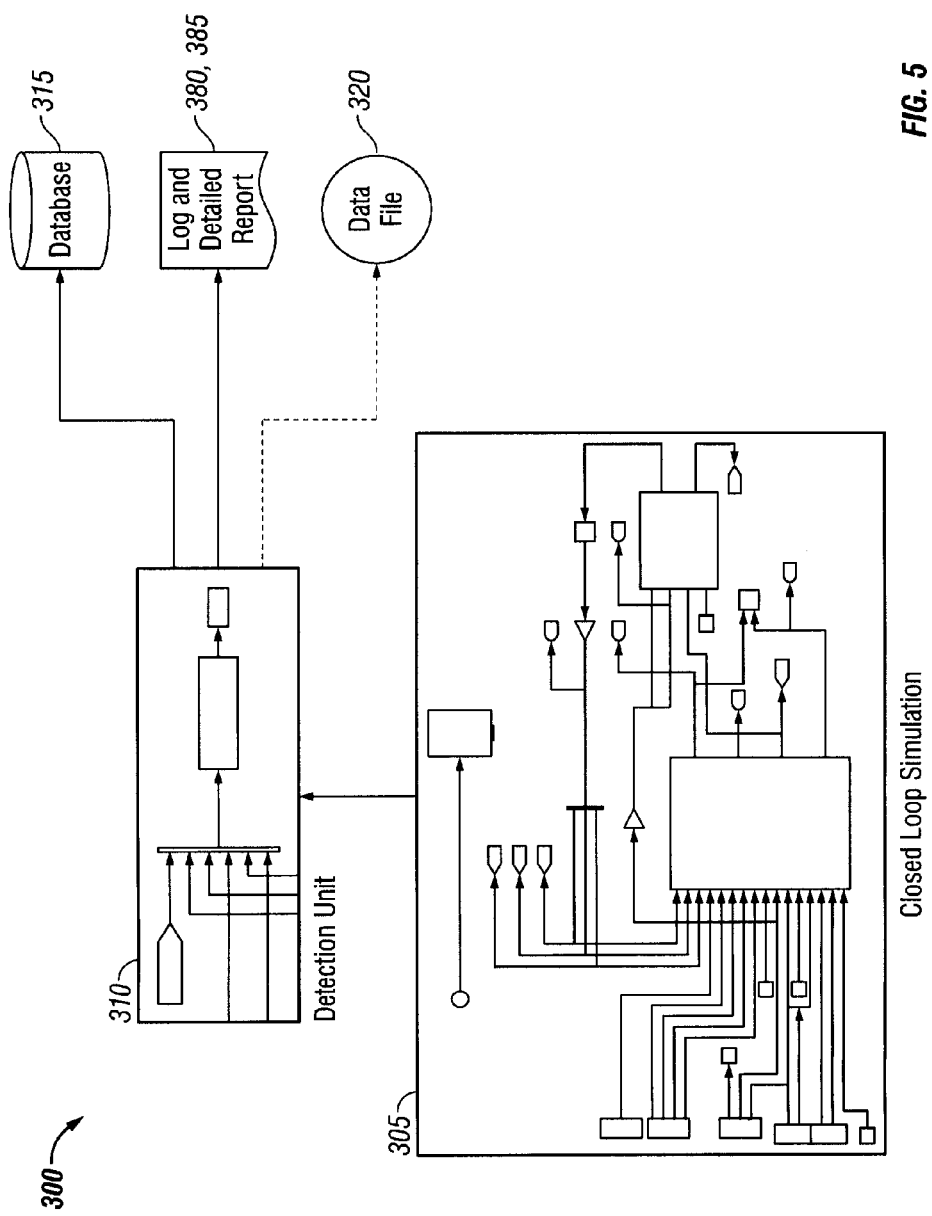
FIG. 5 illustrates a graphical representation of a detection unit in a controller simulation test and database storage of test data, in accordance with the disclosed embodiments.

FIG. 5 illustrates a graphical representation of a detection unit in a simulation test and mass storage of test data 300, in accordance with the disclosed embodiments. The detection unit software module 310 is embedded within the controller simulation testing environment 305. The detection unit 310 executes error detection 290 and performance assessment operations 285, as disclosed herein, within the controller simulation test. The detection unit 310 further collects test run results, thereafter deciding whether a dataset from a test run deviates from the expected results of the controller performance model. The irregular data sets represent deviant controller behavior. Only the irregular datasets are recorded for review in a database 315, problems log 380 and detailed report 385, or other type of data file 320.

Figure 6:
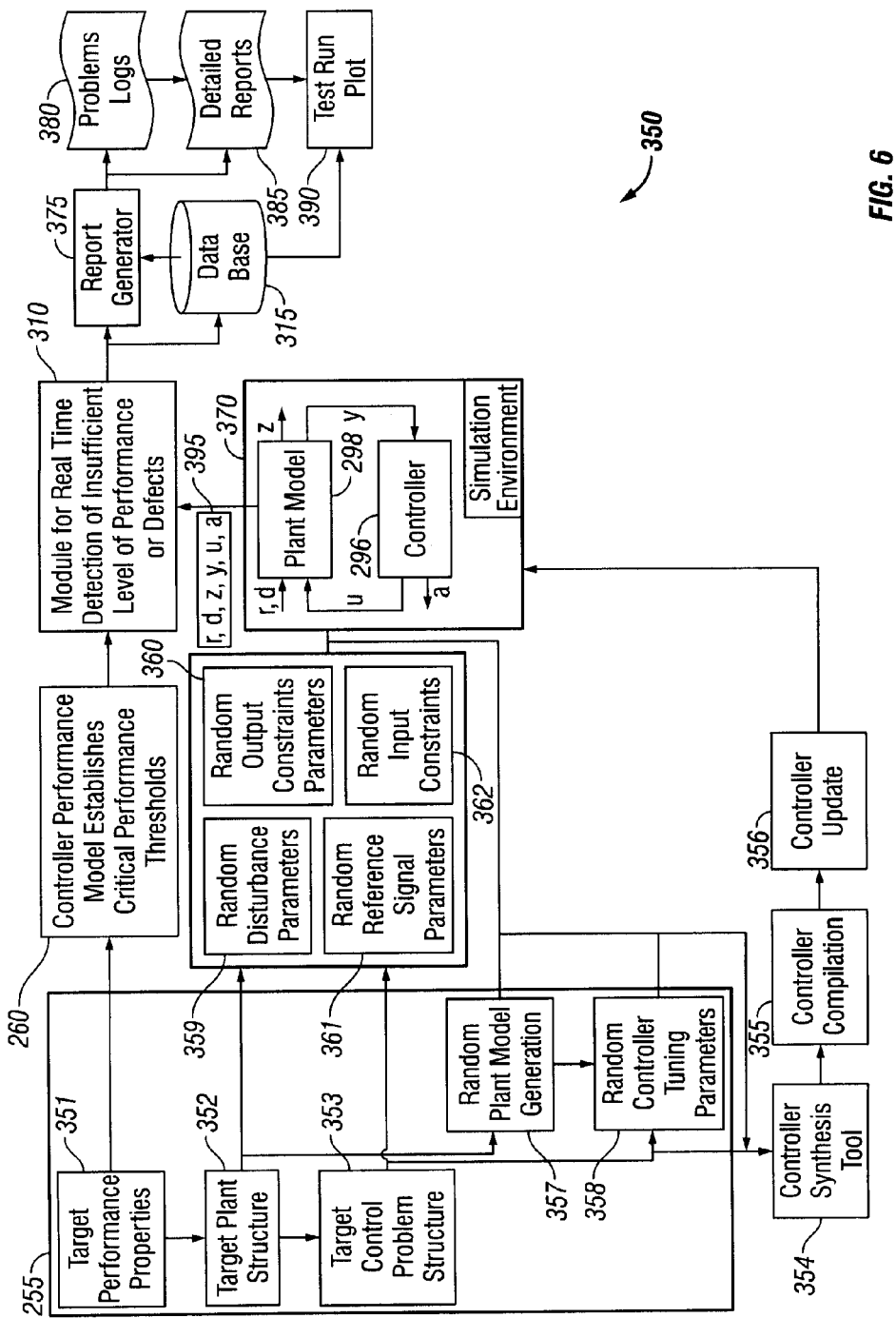
FIG. 6 illustrates a detailed flow chart of controller testing and quantification within a controller simulation testing environment, in accordance with the disclosed embodiments.

FIG. 6 illustrates a detailed flow chart of controller testing and quantification within a controller simulation environment, in accordance with the disclosed embodiments. A controller for testing is supplied to the simulation environment by using a controller synthesis tool 354, controller compilation 355, and controller update procedures 356. The controller is tested in a simulation environment using a series of defined test cases, with each test case outlining specific performance quality parameters for comparison against a controller performance model 260. The test case 255 is defined using target performance properties 351, target plant structure 352, target problem control structure 353, random plant model generation 357, and random controller tuning parameters 358.

Target performance properties 351 define the desired behavioral properties of a controller. These properties are related to different signals generated by a controller and different signals of a controlled simulation testing system. For example, the overshoots of a tracking signal should not exceed a threshold specified in the controller performance model 260 over the duration of a test run. The average error for a tracking signal is an average difference of the tracking signal and its reference over the duration of a test run. The value of this average error should not exceed a threshold specified in the controller performance model 260.

As another example, the steady state error is a difference between the tracking signal, once the system reaches steady state, and the reference signal. Steady state error should not exceed a threshold specified in the controller performance model 260.

The mean square error is a mean square of error over duration of a test run. Mean square error should not exceed a threshold specified in the controller performance model 260. Given N samples of reference signal $r(1), \ldots, r(N)$ and corresponding tracking signal values $y(1), \ldots, y(N)$ the mean square error (MSE) is defined as:

$$MSE = \frac{1}{N}\sum_{j=1}^{N}(r(j)-y(j))^2$$

As a further example, constrained controlled signals should always remain within its constraints. The offset at maximum is the magnitude for which a constrained signal exceeds the maximum limit. The offset at minimum is the magnitude for which a constrained signal exceeds the minimum limit. Both offsets should not exceed a threshold specified in the controller performance model 260. The percentage of time spent in violation of constraints out of the overall duration of a test run should not exceed a threshold specified in the controller performance model 260.

As a further example, the actuator signal's target performance property, such as "time spent on the limits" is specified by the percentage of time spent on the limit out of overall duration of a test run. The actuator signal's target performance properties should not exceed a threshold specified in the controller performance model 260.

Actuator activity is the rate of change of an actuator signal. Actuator activity is represented as a value that should not exceed a threshold specified in the controller performance model 260. Given N samples of an actuator signal $u(1), \ldots, u(N)$ the actuator activity (AA) is defined as:

$$AA = \frac{1}{N}\sum_{j=1}^{N-1}(u(j+1)-u(j))^2$$

As another example, a controller is usually equipped with status signals. In the case of an MPC controller, those signals could be signals representing a choice of tuning settings for a controller, or an index representing the index of an explicitly computed controller. A large number of changes in those signals may represent an unwanted activity of the controller, such as an occurrence of oscillations in the responses of the simulation testing system. When a number of changes within status signals over a duration of a test run is greater than certain threshold defined in the controller performance model 260, that test run needs to be flagged and examined further for potential problems.

The target plant structure 352 is defined using the number of desired inputs and outputs for a plant. For example, the target plant structure's input variables consist of both manipulated variables and input disturbance variables, with the output variables consisting of controlled variables and process variables. The target control problem structure 353 specifies, for example, which process variables are controlled, which controlled variables are tracked, which controlled variables are constrained, which measures signals from target plant structure are considered as disturbances, and what comprises the manipulated variables.

Random control tuning parameters 358 are fed into a controller synthesis tool 354, controller compilation 355, and controller update 356 procedures. Random controller tuning parameters 358 are generated within specified ranges of allowable weightings used for controller tuning settings based on the information on control problem structure obtained from the target control problem structure 353. For example, in the case of an MPC controller, weighting matrices R and Q configuring in the cost function can be randomly generated within specified ranges and dimensions.

An individual test run of the controller is generated using the parameters of the test case 255, as well as random input parameters 359, 360, 361, 362. Test run random input parameters include random disturbance parameters 359, random output constraints parameters 360, random reference signal parameters 361, and random input constraints parameters 362. To generate random, stable transfer functions, the ranges for the following parameters are generated: dumping, dominant time constant, steady state gain, and order of transfer function as one or two and random parameters values within those ranges.

Random plant model generation 357 is a computer-implemented software module that generates a random set of transfer functions based on specifications of a number of plant inputs and outputs, including, for example, manipulated variables (MV), controlled variables (CV), disturbance variables (DV), and measured, or plant variables (PV). These variables are obtained from the target plant structure block 352.

For each disturbance variable (DV) specified in target plant structure 352, a random disturbance signal is generated within the simulation environment. Parameters defining a random disturbance signal 359 are mean value, magnitude range, rate of change, and seed number for random number generation. By recording these random disturbance signal parameters 359, a test run can be recreated and repeated.

Each controlled variable can be constrained with both minimum and maximum permissible values. For each of the constraints specified for controlled variables (CV) in the target control problem structure 353, a random output signal is generated. The random output signal represents the random output constraints and parameters 360 within the simulation environment. Parameters defining the random signal for a constraint of the CV signal are mean value, magnitude range, rate of change, and seed number for random number generator. By recording these random output and input parameters 360, a test run can be recreated and repeated.

For each of tracking controlled variables (CV) specified in the target control problem structure 353 and the target plant structure 352, a reference signal is defined. The reference signal is represented as a random reference signal and is generated within the simulation environment. The random reference signal represents the random reference signal parameters 361 within the simulation environment. Parameters defining the random reference signal are mean value, magnitude range, rate of change, and seed number for random number generator. By recording these random reference signal parameters 361, a test run can be recreated and repeated.

Each manipulated variable is constrained with its minimum and maximum permissible values. For each of the constraints specified for manipulated variables (MV) in target control problem structure 353, a random input signal is generated. The random input signal represents the random input constraint 362 within the simulation environment. Parameters defining the random signal for a constraint of a manipulated variable are mean value, magnitude range, rate of change, and seed number for random number generator. By recording these random input parameters 362, a test run can be recreated and repeated.

The critical performance thresholds for the controller performance model 260 are then fed into the detection unit 310 for comparison of the performance threshold of the tested controller. The detection unit 310 uses these critical performance thresholds as parameters for rules-based performance model in order to evaluate a controller's performance quality test results.

The plant model 298 and controller 296 are configured within the simulation environment 370 and the controller 296 is tested using the defined parameters of a test case 255. Variables 395 r (reference signals), d (disturbance signals), z (measured signals or plant variables), y (controlled variables), u (manipulated variables), and a (controller status signals) 395 are used within the simulation environment. The reference and disturbance signals (r, d) are inputted into the plant model. The plant model then outputs measured signals or plant variables (z). The plant model inputs controlled variables (y) into the controller, while the controller outputs manipulated variables (u) back to the plant model. Finally, the controller outputs controller status signals (a). Variables 395 are then sent to the detection unit 310 for analysis.

The detection unit 310, collects sequences of data samples for the duration of a test run, or period T, of controller simulation test. The detection unit 310 analyzes the test results to find deviations from the expected controller performance model results. Only those test run results that deviate from the expected results of the controller performance model are recorded in the report generator 375 for further analysis. The detection unit 310 then quantifies controller performance by computing key performance indicators and determines the controller's quality following quantitative comparison with the controller performance model's control settings. The detection unit 310 also generates corresponding reports on irregular datasets. Details of deviating test run results may be viewed in a problems log 380 to determine if further action needs to be taken for controller modification. For further information on a specific, deviating test run, details on specific deviating test runs is provided in a detailed report 385. The results of the detailed report for the duration of the test run may be plotted using a test run plot 390. Any deviating results may also be stored in a database 315 before being sent to the report generator 375 or test run plot 390.

Figure 7:
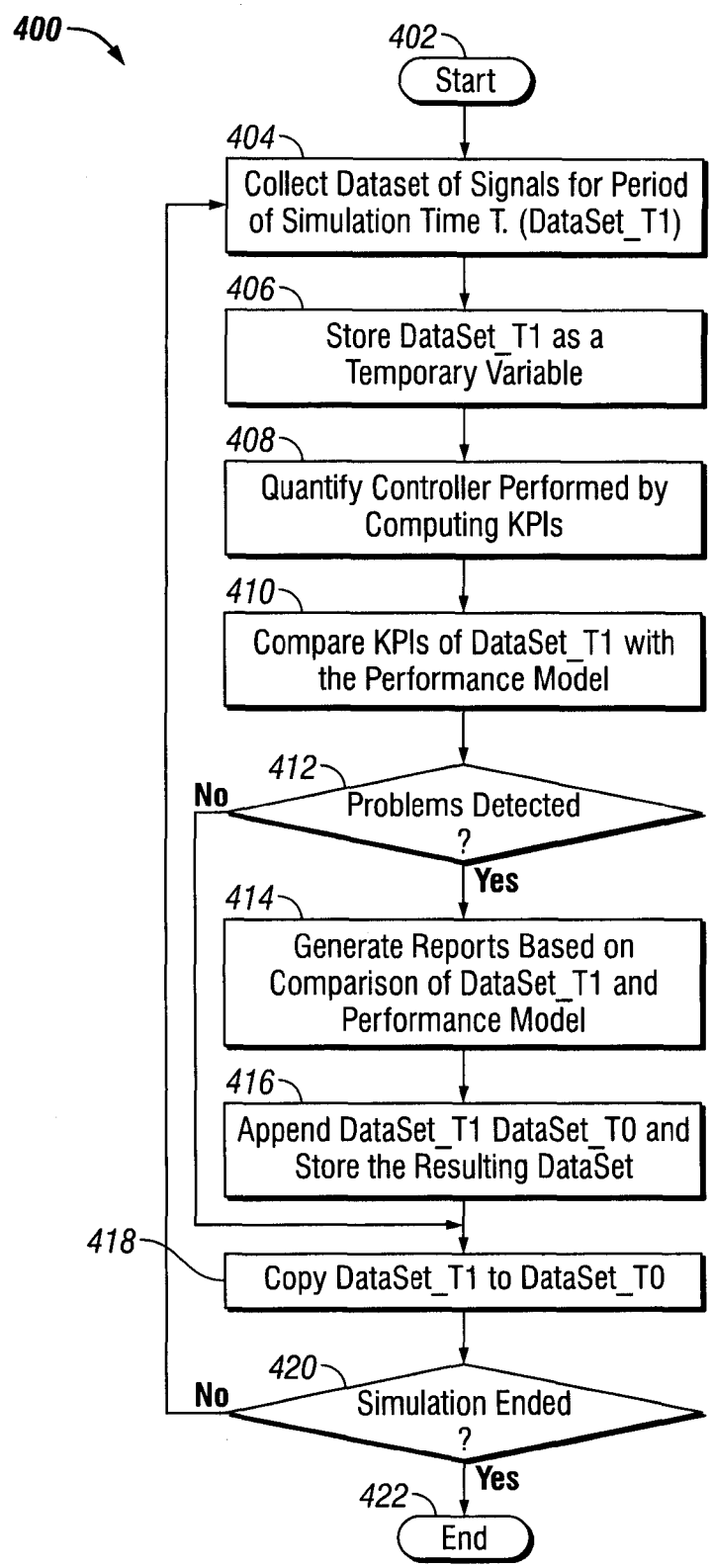
FIG. 7 illustrates a detailed flow chart of operation illustrating assessment of controller quality within a detection unit, in accordance with the disclosed embodiments.

FIG. 7 illustrates a detailed flow chart of a method for assessing controller quality 400 within a detection unit 310, in accordance with the disclosed embodiments. The detection unit 310 starts 402 by collecting a dataset (DataSet_T1) for a period of simulation time T, or the duration of a test run, as illustrated in block 404. Next, this dataset (DataSet_T1) is stored as a temporary variable, as illustrated in block 406. The controller's performance is then quantified by computing key performance indicators of parameters of a test case 255 with the controller performance model 260, as illustrated in block 408. Key performance indicators for a test run can include, but not limited to, the following: magnitude of an overshoot of tracking signal, average error between tracking signal and reference signal, steady state error of a tracking signal, mean square error between tracking signal and reference signal, offset at maximum for constrained signal, offset at minimum for constrained signal, percentage of time during a test run spent in violation of constraints, actuator activity for a manipulated variable (actuator signal), percentage of time out of duration of a test run for an actuator spending on limits, or number of changes over the duration of a test run for a controller status signal such as tuning index or region index in a case of MPC controller.

These computed key performance indicators on the dataset (DataSet_T1) are compared with the parameters of the controller performance model 260, as disclosed herein, as illustrated in block 410. The result of these comparisons can indicate a problem with controller or deterioration of performance of the controller. The comparison can be implemented as a series of conditions in a scripting language, for example. Results of the comparison can be true or false, present or not present, of satisfactory or unsatisfactory, depending on what type of performance property is being tested. For example, a controller's performance could be deficient if: the magnitude of an overshoot for a tracking signal is over the defined threshold, the steady state error is over permissible maximal value, or the percentage of time spent on constraints for an actuator is longer than specified in the corresponding threshold for that key performance indicator.

If these or other similar deviations are detected between the values of the key performance indicators in the test run results as illustrated in block 412, as compared to the parameters of the controller performance model 260, then the system records the deviating dataset (DataSet_T1) in a problems log 380. Reports are generated for all the cases where problems were detected as described, as illustrated in block 414. In a problems log 380, an additional line is added for each deviating result with all computed key performance indicators for all relevant signals. A corresponding detailed report is created with all computed key performance indicators for all relevant signals.

The system then appends the stored dataset (DataSet_T1) to (DataSet_T0) and store them both as (DataSet), as illustrated in block 416. The previous dataset (DataSet_T1) is then replaced with a new dataset (DataSet_T0) following modification or restart of the simulation testing, as illustrated in block 418. The system then has the option to determine whether the simulation has ended, or whether data should be collected for another test run, as illustrated in block 420. The system records the data from the simulation, starting again with block 404 and repeating blocks 404 to 420. The simulation ends 422 when a predetermined number of test runs have been completed, a specific problem within a test run has been detected, or a predetermined number of problematic test runs have been recorded.

Figure 8:
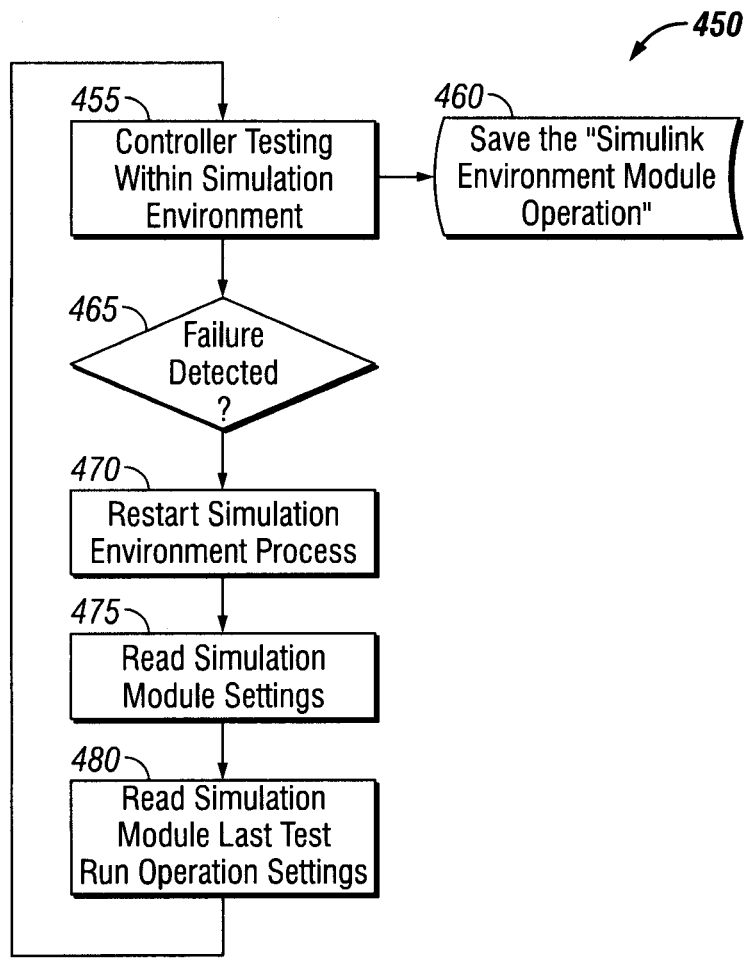
FIG. 8 illustrates a detailed flow chart of operation illustrating an automatic controller simulation testing restart, in accordance with the disclosed embodiments.

FIG. 8 illustrates a detailed flow chart of operation of an automatic controller simulation testing restart module 450, in accordance with the disclosed embodiments. In case of a failure or an error within the simulation environment process, or its child process, here called a controller simulation testing module, the simulation environment and the controller simulation testing process can be restarted. In the case of computer operation problem, the tool restarts itself and the test continues where it has stopped without user intervention. The automatic restart feature of the controller simulation testing module provides increased testing independence and autonomy, preventing long amounts of testing downtime and constant user attention.

The automatic controller testing simulation restart module 450 begins operation with a controller performance quality test taking place within a simulation environment, such as, for example, Simulink, as illustrated in block 455. The simulation environment module settings, and the settings of each test run, may be saved for use in restarting the simulation, as illustrated in block 460. When a failure in the simulation environment occurs, as illustrated in block 465, the automatic restart module 450 automatically initiates a restart of the simulation environment process, as illustrated in block 470. A random generation of test runs is available and the sequence of test runs is repeatable. Following restart initiation, the automatic controller restart module 450 recognizes and reads the simulation module settings from the start of testing, as illustrated in block 475. The restart module 450 then reads the previously recorded test run operational settings, as illustrated in block 480. The automatic controller restart module 450 then resumes controller simulation testing from that previously recorded test run, as illustrated in block 455.

Figure 9:
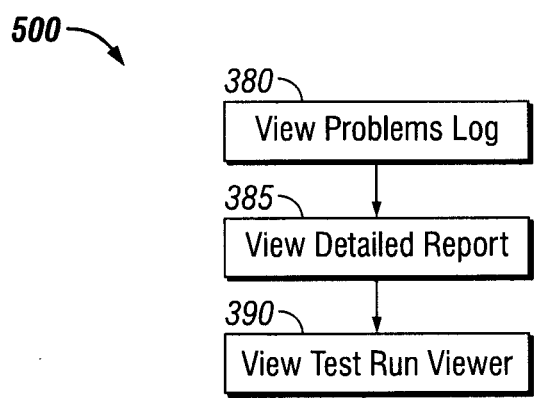
FIG. 9 illustrates a block diagram of controller test run data storage and viewing methods following controller testing, in accordance with the disclosed embodiments.

FIG. 9 illustrates a block diagram of controller test run data storage and viewing methods following controller testing 500, in accordance with the disclosed embodiments. Only those controller test results that deviate from the set key performance indicators and parameters of the controller performance model 260 are recorded for review. Deviating test run results may be reviewed in a number of expanded viewing options, with greater detail provided on such deviations in each subsequently expanded view. The expanded viewing options to view deviating test run results include: a problems log showing deviating test run results, illustrated in FIG. 10; a detailed report 385 for a specific test run as selected from a problems log 380, illustrated in FIG. 11; and, a graphical display of a test run's results in a test run plot, or test run viewer, illustrated in FIG. 12.

FIG. 10 illustrates a graphical representation 550 of a problems log 380, as disclosed herein, containing values of a tested controller's key performance indicators, in accordance with the disclosed embodiments. Each results line of problems log 380 contains key performance indicator values 555 of a controller's performance during an individual test run. Displayed in column format is a defined testing parameter 560 used for testing the controller during a test run, such as, for example "tracking signal" 556. Other example parameters shown in the example problems log 380 include constrained signal 560, appearance of oscillations 562, actuators' time spent on limits 564. These key performance indicators, as defined in the controller performance model 260, as disclosed herein, are computed for a data set of a test run in order to quantify performance properties of the controller in the simulation test and enable performance assessment. For example, the tracking signal parameter 556 is broken down into the following key performance indicators for a test run: the steady state error of the tracking signal 557, the maximum deviation from the reference signal 558, and the average deviation from the reference signal 559. Each column for these key performance indicators records and displays any deviating results for a test run, should they exist.

A specific problem with a key performance indicator is searched for within the problems log 380, such as a problem where actuators spend overly long time on constraints. Then, the first occurrence of this problem is located, and the detailed report 385 is selected for that first occurrence. The period of time the actuator spent on those constraints are observed. The test run plot 390 of that detailed report 385 is opened to compare the plots from the viewer to the detailed report 385. A suggestion may then be made by the examiner (user) on potential source of the problem, such as an error in the code, tuning overly aggressive, instability, limits too narrow, and possible sources of these problems. This process may be repeated until similar problems reviewed or the source of the problem is corrected.

Figure 11:
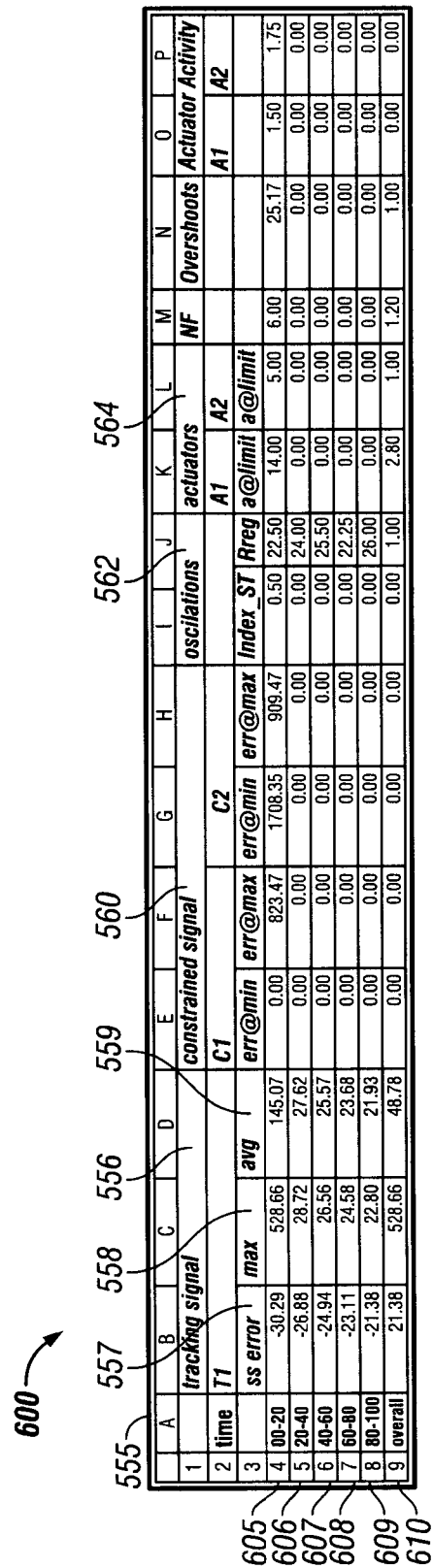
FIG. 11 illustrates a graphical representation of a detailed report from a problems log containing values of a controller's key performance indicators, in accordance with the disclosed embodiments.

FIG. 11 illustrates a graphical representation 600 of a detailed report 385 from a problems log 380 containing values of a tested controller's key performance indicators, in accordance with the disclosed embodiments. A user accesses a detailed report 385 for a test run by selecting a results line 555 from the problems log 380. The same parameters from the problems log 380, tracking signal 560, constrained signal 565, oscillations 570, actuators 575, and NF 580, are displayed in the detailed report 385 for a specific test run. The detailed report 385 shows a test run's results over specific time intervals of the duration of a test run. For example, the key performance indicators are displayed in ranges of twenty percent time intervals (00-20% 605, 20-40% 606, 40-60% 607, 60-80% 608, and 80-100% 609), divided evenly over the length of the test run. For each twenty percent time interval of a test run, a key performance indicator is computed. The deviations of the key performance indicator for a one hundred percent test run time interval are displayed as the bottom line 610 of the detailed report 385 marked with "overall" 610. It is from the deviations present in this overall test run results line 610 that the detection unit 310, as disclosed herein, decides to categorize a test run as devious. The detection unit then records any deviating test run.

Figure 12:
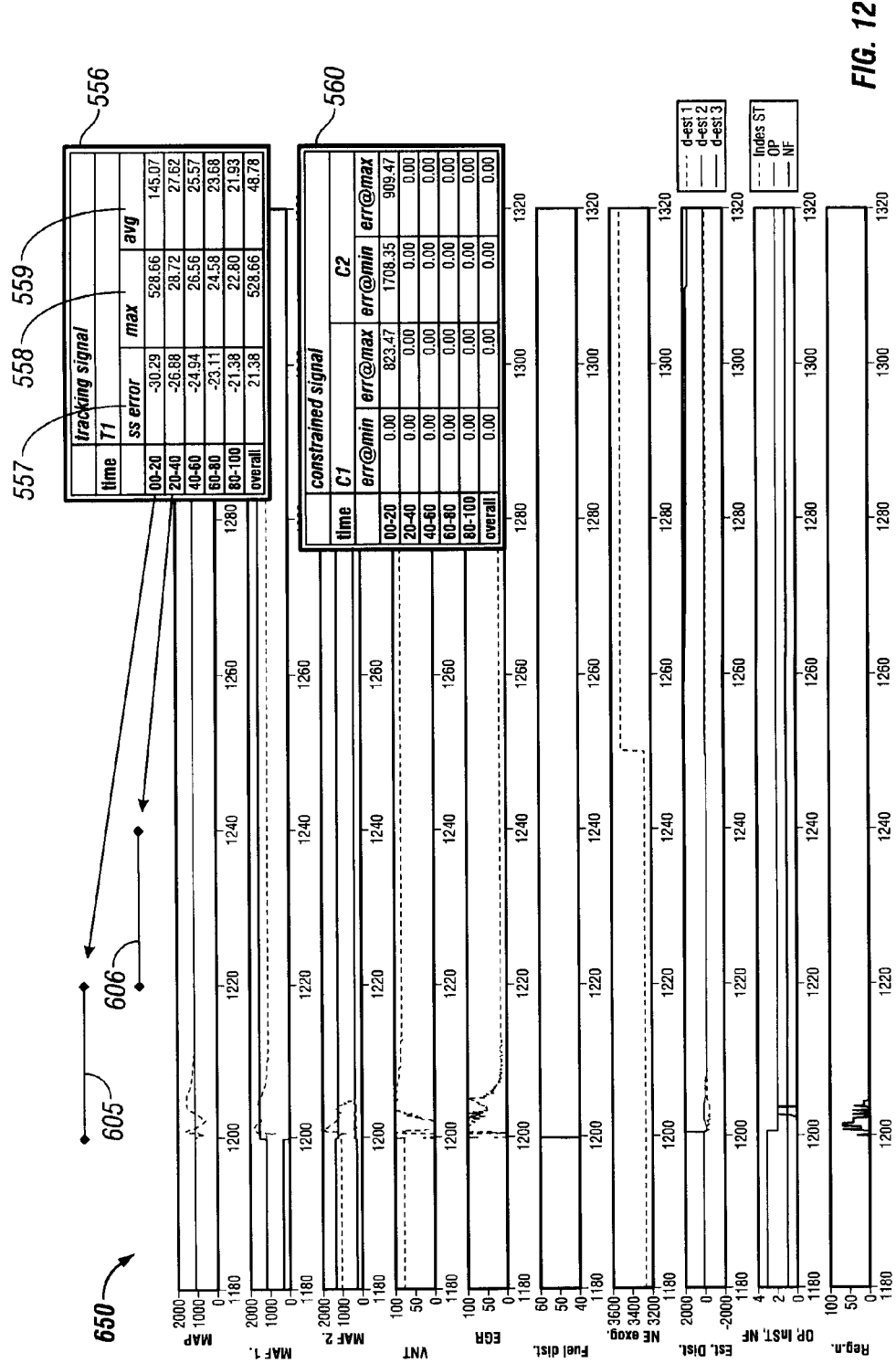
FIG. 12 illustrates a graphical representation of a test run plot of a detailed report from a problems log containing values of a controller's key performance indicators, in accordance with the disclosed embodiments.

FIG. 12 illustrates a graphical representation 650 of a test run plot 390 of a detailed report 385 from a problems log 380 containing values of controller's key performance indicators computed for a test run, in accordance with the disclosed embodiments. A test run plot is a graphical representation of the detailed report 385, showing a test run's results 557, 558, 559 for the same parameters 556 and 560 from the detailed report 385, over specific time increments, such as 605 and 606, as previously disclosed.

Figure 13:
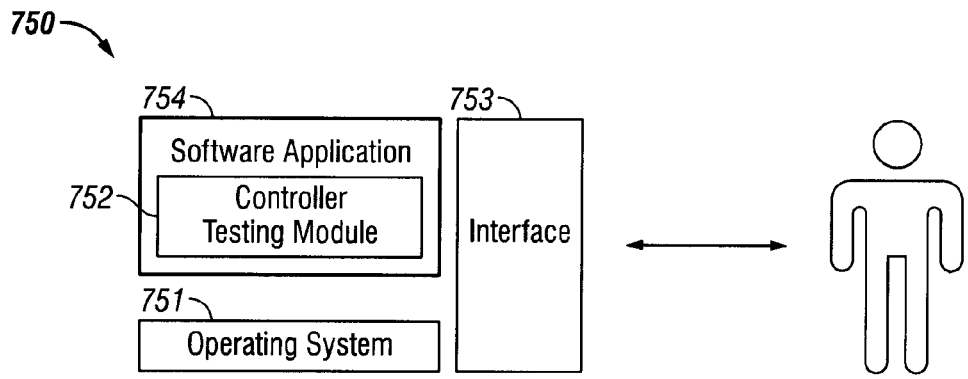
FIG. 13 illustrates a schematic view of a software system including an operating system, application software, and a user interface for carrying out a disclosed embodiment.
Figure 14:
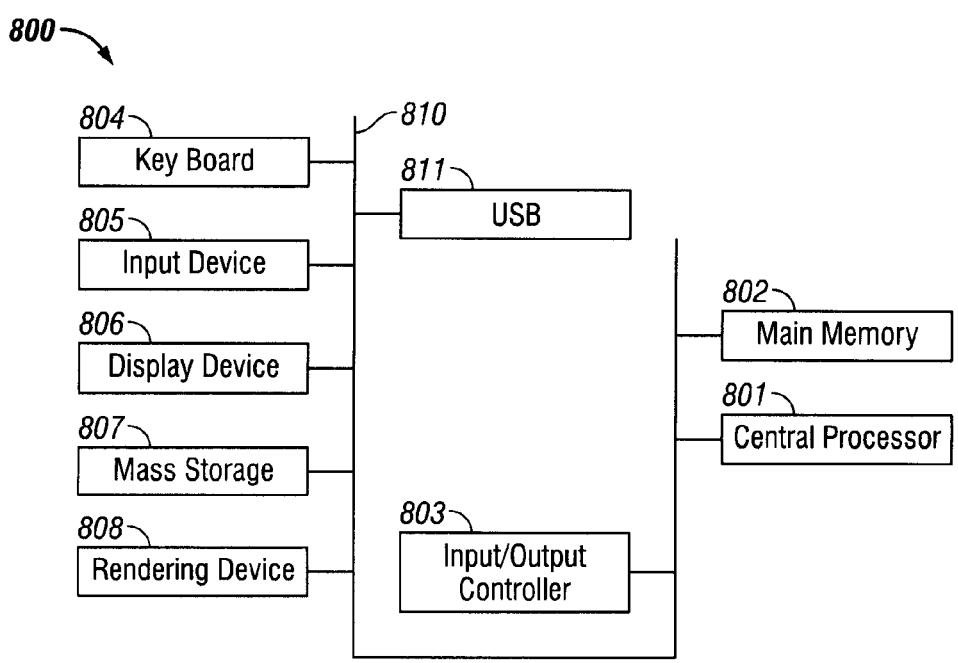
FIG. 14 illustrates a schematic view of a data-processing system in which a disclosed embodiment may be implemented.

FIGS. 13-14 are provided as exemplary diagrams of data-processing environments in which embodiments of the present invention may be implemented. It should be appreciated that FIGS. 13-14 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

FIG. 13 illustrates a computer software system 750 for directing the operation of the data-processing system 800 depicted in FIG. 14. Software application 754, stored in main memory 802 and on mass storage 807 (as described in FIG. 14), generally includes a kernel or operating system 751 and a shell or interface 753. One or more application programs, such as software application 754, may be "loaded" (i.e., transferred from mass storage 807 into the main memory 802) for execution by the data-processing system 800. The data-processing system 800 receives user commands and data through user interface 753; these inputs may then be acted upon by the data-processing system 100 in accordance with instructions from operating system module 751 and/or software application 754.

The following discussion is intended to provide a brief, general description of suitable computing environments in which the system and method may be implemented. Although not required, the disclosed embodiments will be described in the general context of computer-executable instructions, such as program modules, being executed by a single computer. In most instances, a "module" constitutes a software application.

Generally, program modules include, but are not limited to routines, subroutines, software applications, programs, objects, components, data structures, etc., that perform particular tasks or implement particular abstract data types and instructions. Moreover, those skilled in the art will appreciate that the disclosed method and system may be practiced with other computer system configurations, such as, for example, hand-held devices, multi-processor systems, data networks, microprocessor-based or programmable consumer electronics, networked PCs, minicomputers, mainframe computers, servers, and the like.

Note that the term module as utilized herein may refer to a collection of routines and data structures that perform a particular task or implements a particular abstract data type. Modules may be composed of two parts: an interface, which lists the constants, data types, variable, and routines that can be accessed by other modules or routines, and an implementation, which is typically private (accessible only to that module) and which includes source code that actually implements the routines in the module. The term module may also simply refer to an application, such as a computer program designed to assist in the performance of a specific task, such as word processing, accounting, inventory management, etc.

The interface 753, which is preferably a graphical user interface (GUI), can serve to display results, whereupon a user may supply additional inputs or terminate a particular session. In some embodiments, operating system 751 and interface 753 can be implemented in the context of a "Windows" system. It can be appreciated, of course, that other types of systems are potential. For example, rather than a traditional "Windows" system, other operation systems, such as, for example, Linux may also be employed with respect to operating system 751 and interface 753. The software application 754 can include, for example, a controller testing module 752 for providing a controller testing simulation environment. The controller testing module 752 can include instructions, such as those of method 400 and 450 discussed herein with respect to FIGS. 7-8.

The following description is presented with respect to embodiments of the present invention, which can be embodied in the context of a data-processing system 800 depicted in FIG. 14. The present invention, however, is not limited to any particular application or any particular environment. Instead, those skilled in the art will find that the system and methods of the present invention can be advantageously applied to a variety of system and application software, including database management systems, word processors, and the like. Moreover, the present invention can be embodied on a variety of different platforms, including Macintosh, UNIX, LINUX, and the like. Therefore, the description of the exemplary embodiments, which follows, is for purposes of illustration and not considered a limitation.

As illustrated in FIG. 14, the disclosed embodiments may be implemented in the context of a data-processing system 800 that includes, for example, a central processor 801, a main memory 802, an input/output controller 803, a keyboard 804, an input device 805 (e.g., a pointing device, such as a mouse, track ball, pen device, etc), a display device 806, a mass storage 807 (e.g., a hard disk), and a USB (Universal Serial Bus) peripheral connection 811. Additional input/output devices, such as a rendering device 108 (e.g., printer, scanner, fax machine, etc), for example, may be associated with the data-processing system 800 as desired. As illustrated, the various components of data-processing system 800 can communicate electronically through a system bus 810 or similar architecture. The system bus 810 may be, for example, a subsystem that transfers data between, for example, computer components within data-processing system 800 or to and from other data-processing devices, components, computers, etc.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A computer-implemented method for efficiently testing a performance quality of a proposed controller algorithm in a simulation testing environment, the proposed controller algorithm for controlling a plant, comprising:
   determining a controller performance model, the controller performance model establishing one or more performance thresholds corresponding to an expected result obtained from the controller performance model;
   assigning a key performance indicator to the controller performance model for testing, wherein the key performance indicator quantifies a deviation from the one or more performance thresholds to indicate the quality of the controller performance;
   performing a controller performance quality test of said proposed controller algorithm in the simulation testing environment including a plant model, wherein the controller performance quality test includes running numerous test runs using software in a loop computer-implemented simulation without requiring user input between each of the numerous test runs;
   obtaining test results from the controller performance quality test for each of the numerous test runs;
   determining the key performance indicator using the obtained test results for the numerous test runs, wherein the key performance indicator is obtained by quantitatively comparing the obtained test results to the one or more performance thresholds established using the controller performance model, wherein the determined key performance indicator quantifies the performance quality of said proposed controller algorithm; and
   displaying on a display a subset of the obtained test results for review by a user, the displayed subset of the obtained test results representing test results in which a variance between the obtained test results and the one or more performance thresholds exceeds a threshold.

2. The method of claim 1 further comprising selecting a proposed controller algorithm for testing and establishing performance requirements of said proposed controller algorithm, by executing a program instruction in a data processing apparatus.

3. The method of claim 1 wherein the controller performance model includes testing parameters and rules to identify a desired result.

4. The method of claim 1 further comprising recording and analyzing said test results that deviate from said controller performance model's one or more performance thresholds using an error detection module.

5. The method of claim 4 further comprising said error detection module executing performance assessment and error detection modules, collecting controller performance test run results, determining whether said test results deviate from the one or more performance thresholds, and generating test result reports on deviating test run results.

6. The method of claim 5 wherein said test result reports on deviating test run results comprise a problems log, a detailed report, and a test run plot, wherein said test run reports comprise displayed data of deviating results of a key performance indicator value of said tested controller algorithm as compared to the one or more performance thresholds as established in said controller performance model.

7. The method of claim 1 further comprising defining the one or more test runs for performing the controller performance quality test, wherein at least one of said test runs includes at least one fixed parameter and at least one simulated random parameter.

8. The method of claim 7 wherein said fixed parameter comprises at least one of the following:

inputs and outputs of the plant;
control strategy to be applied;
controller topologies;
internal control models;
controller tuning parameters;
soft constraints parameters; and
dead band parameters.

9. The method of claim 7 wherein said at least one simulated random parameter of said test case comprises at least one of the following: a random disturbance parameter, a random output constraints parameter, a random reference signal parameter, and a random input constraints parameter.

10. The method of claim 1 further comprising automatically restarting said controller performance quality test within the simulation testing environment, wherein an error in said simulation environment occurs and an automatic restart module initiates restart of said simulation testing environment, wherein said simulation testing environment continues said controller performance quality test from a previously-recorded test, said controller performance quality test using a recorded simulation test environment setting.

11. A system for efficiently testing a performance quality of a proposed controller algorithm in a simulation testing environment, the proposed controller algorithm for controlling a plant, the system comprising:
a processor;
a data bus coupled to said processor; and
a non-transitory computer-usable medium embodying computer code, said computer-usable medium being coupled to said data bus, said computer program code comprising instructions executable by said processor and configured for:
assigning a key performance indicator to a controller performance model for testing, wherein the key performance indicator quantifies a deviation from one or more performance thresholds to indicate the quality of the controller performance;
performing a controller performance quality test of said proposed controller algorithm in the simulation testing environment including a plant model, wherein the controller performance quality test includes running numerous test runs without requiring user input between each of the numerous test runs;
obtaining test results in response to the controller performance quality test for each of numerous test runs;
determining the key performance indicator using the obtained test results for the numerous test runs, wherein the key performance indicator is obtained by quantitatively comparing the obtained test results to the one or more performance thresholds, wherein the determined key performance indicator quantifies the performance quality of said proposed controller algorithm; and
displaying on a display a subset of the obtained test results for review by a user, the displayed subset of the obtained test results representing test results in which a variance between the obtained test results and the one or more performance thresholds exceeds a threshold.

12. The system of claim 11 wherein said proposed controller algorithm is selected for testing and performance requirements of said proposed controller algorithm are established.

13. The system of claim 11 wherein said controller performance model includes rules that identify, at least in part, the proposed controller algorithm's desired behavior.

14. The system of claim 11 wherein said test results that deviate from said controller performance model's one or more performance thresholds are recorded in a memory.

15. The system of claim 14 further comprising a detection module that executes performance assessment and error detection modules, collects controller performance test results, determines whether said test results deviate from said one or more performance thresholds as established in said controller performance model, and generates test result reports on deviating test run results.

16. The system of claim 15 wherein said generated test result reports comprise a problems log, a detailed report, and a test run plot, wherein said test result reports comprise displayed data of deviating results of a key performance indicator value of said tested controller algorithm as compared to the key performance indicator .

17. The system of claim 11 wherein the one or more test runs include a fixed parameter and a simulated random parameter.

18. The system of claim 17 wherein said fixed parameter comprises at least one of the following:
inputs and outputs of the plant;
control strategy to be applied;
controller topologies;
internal control models;
controller tuning parameters;
soft constraints parameters; and
dead band parameters.

19. The system of claim 17 wherein said simulated random parameter comprises at least one of the following: a random disturbance parameter, a random output constraints parameter, a random reference signal parameter, and a random input constraints parameter.

20. The system of claim 11 wherein said controller performance quality test is automatically restarted, wherein when an error in said simulation testing environment occurs, an automatic restart module initiates restart of said simulation testing environment, wherein said simulation testing environment continues said controller performance quality test from a previously-recorded test, said controller performance quality test using a recorded simulation test environment setting.

21. A system for efficiently testing a performance quality of a proposed controller algorithm in a simulation testing environment for a model predictive control (MPC) controller, the proposed controller algorithm for controlling a plant, the system comprising:
a processor;
a data bus coupled to said processor; and
a non-transitory computer-usable medium embodying computer code, said computer program code comprising instructions executable by said processor and configured for:
reading a proposed controller performance model for a model predictive control (MPC) algorithm;
assigning a key performance indicator to the proposed controller performance model for testing, wherein the key performance indicator quantifies a deviation from one or more defined performance thresholds to indicate the quality of the controller performance;
performing a controller performance quality test of said proposed controller algorithm in the simulation testing environment including a plant model, wherein the controller performance quality test includes using numerous test runs without requiring user input between each of the numerous test runs;

obtaining test results from the controller performance quality test for the numerous test runs;

determining the key performance indicator using the obtained test results for each of the numerous test runs, wherein the key performance indicator is obtained by quantitatively comparing the obtained test results to the one or more defined performance thresholds, wherein the determined key performance indicator quantifies the performance quality of said proposed controller algorithm; and displaying on a display a subset of the obtained test results for review by a user.

* * * * *